(12) United States Patent
Chen et al.

(10) Patent No.: US 11,411,488 B2
(45) Date of Patent: Aug. 9, 2022

(54) METHOD AND APPARATUS FOR CONTROLLING MODES OF INVERTER CIRCUIT, AND INVERTER

(71) Applicant: SUNGROW POWER SUPPLY CO., LTD., Anhui (CN)

(72) Inventors: Peng Chen, Hefei (CN); Jinhu Cao, Hefei (CN); Wei Bie, Hefei (CN); Leiming Lin, Hefei (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 0 days.

(21) Appl. No.: 16/932,273

(22) Filed: Jul. 17, 2020

(65) Prior Publication Data

US 2021/0044198 A1 Feb. 11, 2021

(30) Foreign Application Priority Data

Aug. 6, 2019 (CN) .......................... 201910721226.3

(51) Int. Cl.
 *H02M 1/32* (2007.01)
 *H02M 7/539* (2006.01)

(52) U.S. Cl.
 CPC ............. *H02M 1/32* (2013.01); *H02M 7/539* (2013.01); *H02M 1/325* (2021.05)

(58) Field of Classification Search
 CPC .................................................... H02M 7/487
 See application file for complete search history.

(56) References Cited

U.S. PATENT DOCUMENTS

| 2014/0334199 A1 | 11/2014 | He et al. |
| 2018/0062537 A1 | 3/2018 | Wang et al. |

FOREIGN PATENT DOCUMENTS

| CN | 104467392 A | 3/2015 |
| CN | 104578886 A | 4/2015 |
| CN | 105141158 A | 12/2015 |
| CN | 109672356 A | 4/2019 |
| EP | 2706653 A1 | 3/2014 |
| JP | 2005137045 A | 5/2005 |

OTHER PUBLICATIONS

European Search Report regarding Application No. 20188360.0 dated Dec. 9, 2020.
Shayestegan, Mohsen et al., "An Overview on Prospects of New Generation Single-Phase Transformerless Inverters for Grid-Connected Photovoltaic (PV) Systems," Renewable and Sustainable Energy Reviews 82 (2018), pp. 515-530.

*Primary Examiner* — Peter M Novak
(74) *Attorney, Agent, or Firm* — Harness, Dickey & Pierce, P.L.C.

(57) ABSTRACT

A method and apparatus for controlling a neutral point clamped inverter circuit, and a neutral point clamped inverter. It is detected that whether the inverter circuit operates in an abnormal state. In a case that the inverter circuit operates in the abnormal state, a control mode of the inverter circuit is changed to a specified control mode in which a transistor that may be damaged is in an off state. In this way, there is not current flowing through the transistor, avoiding damage of the transistor and thereby improving safety of the inverter circuit.

10 Claims, 5 Drawing Sheets

METHOD AND APPARATUS FOR CONTROLLING MODES OF INVERTER CIRCUIT, AND INVERTER

The application claims the priority to Chinese Patent Application No. 201910721226.3, titled "METHOD AND APPARATUS FOR CONTROLLING INVERTER CIRCUIT, AND INVERTER", filed on Aug. 6, 2019 with the China National Intellectual Property Administration (CNIPA), the content of which is incorporated herein by reference.

TECHNICAL FIELD

The present disclosure relates to the field of inverter technology, and in particular to a method and apparatus for controlling a neutral point clamped inverter circuit, and a neutral point clamped inverter.

BACKGROUND

An inverter is a device for converting direct current energy to alternating current energy, and is generally used in a photovoltaic power generation system. An inverter generally includes an inverter circuit, a control logic and a filtering circuit. The control logic controls an on-off state of each transistor in the inverter circuit, such that the inverter circuit outputs an alternating current signal correspondingly.

In practice, the inverter circuit generally operates in a state with a power factor being approximately equal to 1. Therefore, in order to reduce costs and losses of the inverter circuit, capacity parameters of the transistors are selected generally based on carrying capacities of the transistors operating in a normal state. When the inverter circuit operates in an abnormal state, for example, when a low voltage from a power grid is inputted to the inverter circuit, the inverter circuit will operate in a state with a power factor being equal to 0, and at this time, a reactive current in the inverter circuit is far greater than a current when the inverter circuit operates in the normal state, and is very likely to exceed capacities of some transistors in the inverter circuit, thus damaging the transistors and thereby damaging the entire inverter circuit. In addition, such abnormal state has a low probability of occurrence and a short duration.

SUMMARY

In view of the above, the present disclosure aims to provide a method and apparatus for controlling an inverter circuit, and an inverter, to prevent a transistor from being damaged due to a current flowing through the transistor being greater than a rated current of the transistor, when the inverter circuit operates in an abnormal state. Technical solutions are as follows.

According to a first aspect of the present disclosure, a method for controlling an inverter circuit is provided. The inverter circuit includes at least two control modes, and the inverter circuit is able to operate in a normal state under each of the at least two control modes. The method includes:

detecting whether the inverter circuit operates in an abnormal state, where the abnormal state includes a state when a power factor of the inverter circuit is less than a preset value;

changing a control mode of the inverter circuit from an original control mode to a specified control mode in a case that the inverter circuit operates in the abnormal state, where a specified transistor is in an off state under the specified control mode, and current flowing through the specified transistor when the inverter circuit operates in the abnormal state is greater than a rated current of the specified transistor.

In an embodiment, the method further includes:

changing the control mode of the inverter circuit from the specified control mode back to the original control mode, in a case that the inverter circuit recovers to the normal state from the abnormal state.

In an embodiment, the inverter circuit is a neutral point clamped (NPC) three-level inverter circuit. The NPC three-level inverter circuit includes:

a first capacitor and a second capacitor connected in series, where a first terminal of the first capacitor is connected to a first terminal of the second capacitor, and a second terminal of the first capacitor is connected to a positive pole of a direct current (DC) power supply, and a second terminal of the second capacitor is connected to a negative pole of the DC power supply;

a first transistor, a fifth transistor, a sixth transistor and a fourth transistor sequentially connected in series to form a first series branch, where a first terminal of the first series branch is connected to the second terminal of the first capacitor, and a second terminal of the first series branch is connected to the second terminal of the second capacitor.

a second transistor and a third transistor connected in series to form a second series branch, where a first terminal of the second series branch is connected to a connection node between the fifth transistor and the first transistor, a second terminal of the second series is connected to a connection node between the sixth transistor and the fourth transistor, and a connection node between the second transistor and the third transistor is an output terminal of the inverter circuit.

In an embodiment, the at least two control modes of the inverter circuit include a first control mode, a second control mode and a third control mode;

during a positive half period of a line frequency cycle under the first control mode, a control signal of the first transistor and a control signaling of the fifth transistor are in a high frequency chopping state, and a control signal of the second transistor, a control signal of the third transistor, a control signal of the fourth transistor and a control signal of the sixth transistor are in a low frequency state; during a negative half period of the line frequency cycle under the first control mode, the control signal of the fourth transistor and the control signal of the sixth transistor are in the high frequency chopping state, and the control signal of the first transistor, the control signal of the fifth transistor, the control signal of the second transistor and the control signal of the third transistor are in the low frequency state;

during a full line frequency cycle under the second control mode, the control signal of the second transistor and the control signal of the third transistor are in the high frequency chopping state, and the control signal of the first transistor, the control signal of the fourth transistor, the control signal of the fifth transistor and the control signal of the sixth transistor are in the low frequency state;

during a positive half period of a line frequency cycle under the third control mode, the control signal of the first transistor and the control signal of the third transistor are in the high frequency chopping state, and the control signal of the second transistor and the control signal of the fourth transistor are in the low frequency state; during a negative half period of the line frequency cycle under the third control mode, the control signal of the second transistor and the control signal of the fourth transistor are in the high frequency chopping state, and the control signal of the first transistor and the control signal of the third transistor are in the low frequency state.

In an embodiment, the changing the control mode of the inverter circuit from the original control mode to the specified control mode in the case that the inverter circuit operates in the abnormal state includes:

changing the control mode of the inverter circuit into the third control mode or the second control mode, in a case that the original control mode of the inverter circuit is the first control mode;

alternatively, changing the control mode of the inverter circuit into the first control mode, in a case that the original control mode of the inverter circuit is the second control mode or the third control mode.

According to a second aspect of the present disclosure, an apparatus for controlling an inverter circuit is further provided. The inverter circuit includes at least two control modes, and the inverter circuit is able to operate in a normal state under each of the at least two control modes. The apparatus includes:

a detection module, configured to detect whether the inverter circuit operates in an abnormal state, where the abnormal state includes a state when a power factor of the inverter circuit is less than a preset value; and a control module, configured to control an operation state of the inverter circuit, and change a control mode of the inverter circuit from an original control mode to a specified control mode in a case that the inverter circuit operates in the abnormal state, where a specified transistor is in an off state under the specified control mode, and current flowing through the specified transistor when the inverter circuit operates in the abnormal state is greater than a rated current of the specified transistor.

According to a third aspect of the present disclosure, an inverter is further provided. The inverter includes an inverter circuit and a controller. The inverter circuit includes at least two control modes and the inverter circuit is able to operate in a normal state under each of the at least two control modes;

the controller controls the inverter circuit, detects whether the inverter circuit operates in an abnormal state, and changes a control mode of the inverter circuit from an original control mode to a specified control mode in response to detecting that the inverter circuit operates in the abnormal state, where the abnormal state includes a state when a power factor of the inverter circuit is less than a preset value, a specified transistor is in an off state under the specified control mode, and current flowing through the specified transistor when the inverter circuit operates in the abnormal state is greater than a rated current of the specified transistor.

In an embodiment, the inverter circuit is a neutral point clamped (NPC) three-level inverter circuit. The NPC three-level inverter circuit includes:

a first capacitor and a second capacitor connected in series, where a first terminal of the first capacitor is connected to a first terminal of the second capacitor, a second terminal of the first capacitor is connected to a positive pole of a direct current (DC) power supply, and a second terminal of the second capacitor is connected to a negative pole of the DC power supply;

a first transistor, a fifth transistor, a sixth transistor and a fourth transistor sequentially connected in series to form a first series branch, where a first terminal of the first series branch is connected to the second terminal of the first capacitor, a second terminal of the first series branch is connected to the second terminal of the second capacitor;

a second transistor and a third switch tube connected in series to form a second series branch, where a first terminal of the second series branch is connected to a connection node between the fifth transistor and the first transistor, a second terminal of the second series branch is connected to a connection node between the sixth transistor and the fourth transistor, and a connection node between the second transistor and the third transistor is an output terminal of the inverter circuit.

In an embodiment, the at least two control modes include a first control mode, a second control mode and a third control mode;

during a positive half period of a line frequency cycle under the first control mode, a control signal of the first transistor and a control signal of the fifth transistor are in a high frequency chopping state, and a control signal of the second transistor, a control signal of the third transistor, a control signal of the fourth transistor and a control signal of the sixth transistor are in a low frequency state; during a negative half period of the line frequency cycle under the first control mode, the control signal of the fourth transistor and the control signal of the sixth transistor are in the high frequency chopping state, and the control signal of the first transistor, the control signal of the fifth transistor, the control signal of the second transistor and the control signal of the third transistor are in the low frequency state;

during a full line frequency cycle under the second control mode, the control signal of the second transistor and the control signal of the third transistor are in the high frequency chopping state, and the control signal of the first transistor, the control signal of the fourth transistor, the control signal of the fifth transistor and the control signal of the sixth transistor are in the low frequency state;

during a positive half period of a line frequency cycle under the third control mode, the control signal of the first transistor and the control signal of the third transistor are in the high frequency chopping state, and the control signal of the second transistor and the control signal of the fourth transistor are in the low frequency state; during a negative half period of the line frequency cycle under the third control mode, the control signal of the second transistor and the control signal of the fourth transistor are in the high frequency chopping state, and the control signal of the first transistor and the control signal of the third transistor are in the low frequency state.

In an embodiment, the specified control mode is the third control mode or the second control mode in a case that the original control mode is the first control mode;

alternatively, the specified control mode is the first control mode in a case that the original control mode is the second control mode or the third control mode.

With the method for controlling an inverter circuit according to the present disclosure, it is detected that whether the inverter circuit operates in an abnormal state. In response to detecting that the inverter circuit operates in the abnormal state, it is to change a control mode of the inverter circuit to a specified control mode in which a transistor that may be damaged under the abnormal state of the inverter circuit is configured to be in an off state. In this way, it is able to avoid damage of the transistor since there is no current flowing through this transistor, thereby improving safety of the inverter circuit.

BRIEF DESCRIPTION OF THE DRAWINGS

In order to more clearly describe the technical solutions in the embodiments of the present disclosure or the technical solutions in the conventional technology, drawings to be used in the description of the embodiments of the present disclosure or the conventional technology are briefly described hereinafter. It is apparent that the drawings described below show merely some embodiments of the present disclosure, and those skilled in the art may obtain other drawings according to the provided drawings without any creative effort.

DETAILED DESCRIPTION OF EMBODIMENTS

In practice, capacity of a transistor in an inverter circuit is selected based on a normal operation state of the inverter circuit. In a case that the inverter circuit operates in an abnormal state (for example, when the inverter circuit operates in a state with a power factor being equal to 1), since reactive current in the inverter circuit when operating in the abnormal state is far greater than current when the inverter circuit operates in the normal state, some of transistors in the inverter circuit may be burn out, thereby damaging the entire inverter circuit. In order to solve the technical problem, a method for controlling an inverter circuit is provided in the present disclosure. With the method, in response to detecting that the inverter circuit operates in the abnormal state, a control mode of the inverter circuit is changed to a specified control mode in which a specified transistor is in an off state. Current flowing through the specified transistor when the inverter circuit operates in the abnormal state is greater than a rated current of the specified transistor. The solution aims to change the control mode of the inverter circuit into the specified control mode, such that a transistor which may be damaged under the abnormal state of the inverter circuit is in an off state and hence there is no current flowing through the transistor, which avoids damage of the transistor and improves safety of the inverter circuit.

In order to make the purpose, technical solutions and advantages of embodiments of the present disclosure more clear, technical solutions of embodiments of the present disclosure are clearly and completely described below in conjunction with the drawings of the embodiments of the present disclosure. Apparently, the embodiments described in the following are only some embodiments of the present disclosure, rather than all the embodiments. Any other embodiments obtained by those skilled in the art based on the embodiments in the present disclosure without any creative effort fall within the protection scope of the present disclosure.

Figure 1:
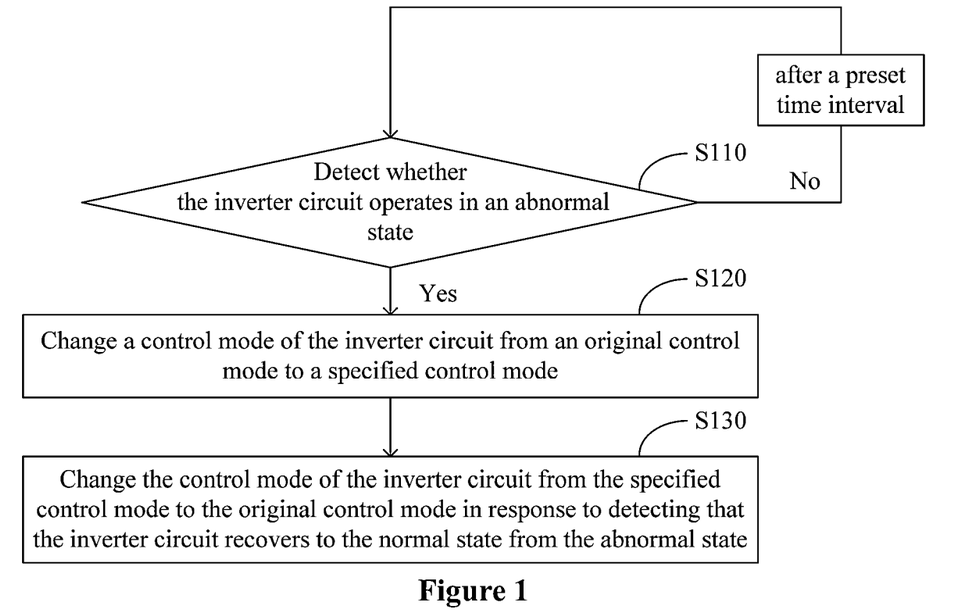
FIG. 1 is a flowchart of a method for controlling an inverter circuit according to the present disclosure.

Reference is made to FIG. 1, which is a flowchart of a method for controlling an inverter circuit according to the present disclosure. The method may be applied in an inverter such as a three-level inverter, a five-level inverter or other multi-level inverter. The method may be applied to any inverter circuit as long as some transistors in the inverter circuit may be damaged when the inverter circuit operates in an abnormal state.

As shown in FIG. 1, the method may include following steps S110 to S130.

In step S110, it is detected that whether the inverter circuit operates in an abnormal state. If the inverter circuit operates in the abnormal state, proceed to step S120. If the inverter circuit does not operate in the abnormal state, return to step S110 after a preset time interval.

In an application scenario, when it is detected that a direct current voltage across the inverter circuit is larger than a preset voltage, it is determined that the inverter circuit operates in the abnormal state. The preset voltage may be determined based on a voltage stress or a rated voltage of a transistor. The voltage stress of the transistor refers to a ratio of an operating voltage of the transistor to a rated voltage of the transistor. Therefore, the preset voltage may be calculated based on the voltage stress and the rated voltage.

In another application scenario, when it is detected that an alternating current in the inverter circuit is larger than a preset current, it is determined that the inverter circuit operates in the abnormal state. The preset current may be determined based on a current stress and a rated current of a transistor. The current stress of the transistor refers to a ratio of an operating current of the transistor to a rated current of the transistor. Therefore, the preset current may be calculated based on the current stress and the rated current.

If it is detected that the inverter circuit operates in the abnormal state, then it is to change a control mode of the inverter circuit. If it is detected that the inverter circuit does not operate in the abnormal state, then it is to continue to detect whether the inverter circuit operates in the abnormal state after the preset time interval. The preset time interval may be set as needed.

In step S120, a control mode of the inverter circuit is changed from an original control mode to a specified control mode.

The specified control mode refers to a control mode under which a specified transistor is in an off state. The specified transistor is a transistor that may be damaged when the inverter circuit operates in the abnormal state.

In step S130, when it is detected that the inverter circuit recovers to the normal state from the abnormal state, the control mode of the inverter circuit is changed from the specified control mode to the original control mode.

A process of changing a control mode of a three-level inverter circuit is described in detail below.

Figure 2:
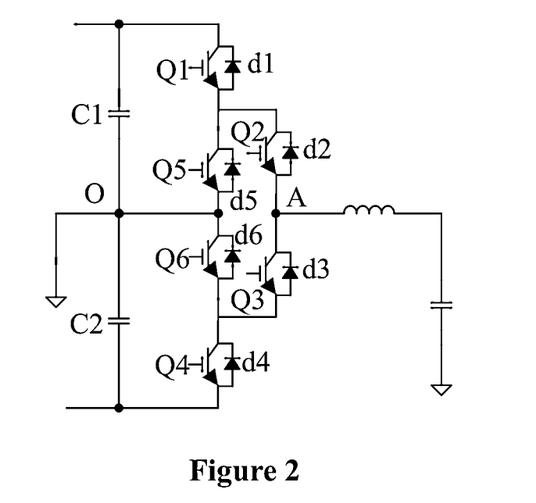
FIG. 2 is a circuit diagram of a neutral point clamped three-level inverter circuit according to the present disclosure.

Reference is made to FIG. 2, which is a circuit diagram of a neutral point clamped three-level inverter circuit according to the present disclosure. As shown in FIG. 2, the neutral point clamped three-level inverter circuit includes a first capacitor C1, a second capacitor C2, a first transistor Q1, a second transistor Q2, a third transistor Q3, a fourth transistor Q4, a fifth transistor Q5 and a sixth transistor Q6.

C1 and C2 are connected in series. A connection node "O" between C1 and C2 (i.e., between a first terminal of C1 and a first terminal of C2) may be connected to a grounded terminal. A second terminal of C1 is connected to a positive pole of a direct current (DC) power supply and a second terminal of C2 is connected to a negative pole of the DC power supply.

Q1, Q5, Q6 and Q4 are sequentially connected in series to form a first series branch. A first terminal of the first series branch is connected to the second terminal of C1, and a second terminal of the first series branch is connected to the second terminal of C2. A connection node between Q5 and Q6 is connected to the connection node between C1 and C2.

Q2 and Q3 are connected in series to form a second series branch. A first terminal of the second series branch is connected to a connection node between Q5 and Q1, and a second terminal of the second series branch is connected to a connection node between Q6 and Q4. A connection node "A" between Q2 and Q3 is an output terminal of the neutral point clamped three-level inverter circuit.

As shown in FIG. 2, each of transistors Q1 to Q6 may be further connected with an antiparallel diode, that is, diodes d1 to d6, in order to prevent a corresponding transistor from breakdown due to a high voltage.

It should be noted that, in an embodiment of the present disclosure, the transistor (Q1 to Q6) may be an insulated gate bipolar transistor (IGBT), and specific type of the transistor may be selected as needed, which is not limited in the present disclosure.

The neutral point clamped three-level inverter circuit has three control modes including a first control mode, a second control mode and a third control mode. Wiring layout of the inverter circuit and types of transistors may be different when the inverter circuit operates in different control modes.

A power factor of the inverter circuit is close to 1 when the inverter circuit operates in the normal state. Since most of time the inverter circuit operates in the normal state, transistors with corresponding parameters are generally selected based on the normal operation state of the inverter circuit.

Figure 3:
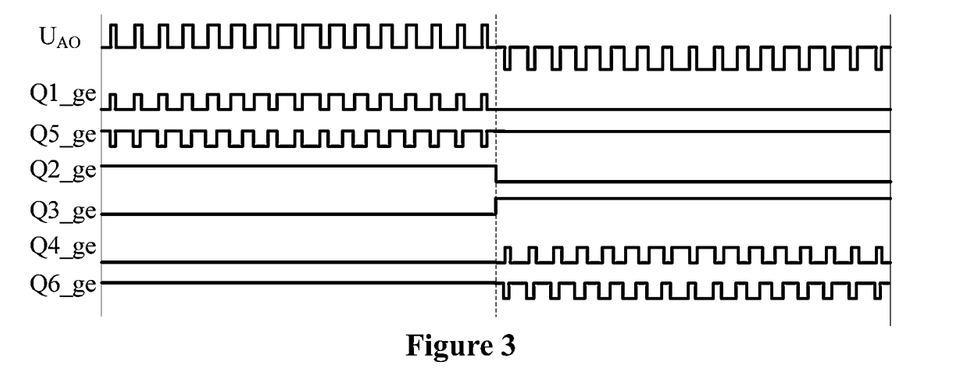
FIG. 3 shows waveforms of control signals of the inverter circuit shown in FIG. 2, upon operating under a first control mode.

Reference is made to FIG. 3, which shows waveforms of control signals of the transistors when the inverter circuit operates in the normal state, under the first control mode.

As shown in FIG. 3, during a positive half period of a line frequency cycle, a control signal of Q1 and a control signal of Q5 are in a high frequency chopping state. A control signal of Q2 is kept in a high level state, a control signal of Q3 is kept in a low level state, a control signal of Q4 is kept in the low level state, and a control signal of Q6 is kept in the high level state.

As shown in FIG. 3, during a negative half period of the line frequency cycle, the control signal of Q4 and the control signal of Q6 are in the high frequency chopping state. The control signal of Q1 is kept in the low level state, the control signal of Q5 is kept in the high level state, the control signal of Q2 is kept in the low level state, and the control signal of Q3 is kept in the high level state.

Under the first control mode, the control signals of Q1, Q5, Q6 and Q4 are in the high frequency chopping state. The control signals of Q2 and Q3 are in a low frequency state. Therefore, it is preferable to select transistors with small switching losses to be Q1, Q5, Q6 and Q4, and select transistors with small conduction losses to be Q2 and Q3.

Figure 4:
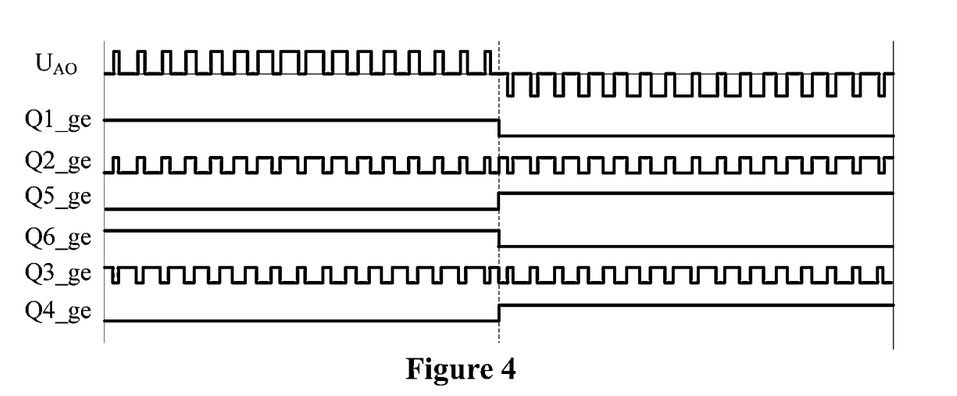
FIG. 4 shows waveforms of control signals of the inverter circuit shown in FIG. 2, upon operating under a second control mode.

Reference is made to FIG. 4, which shows waveforms of control signals of the transistors when the inverter circuit operates in the normal state, under the second control mode.

Under the second control mode, during a full line frequency cycle, the control signals of Q2 and Q3 are in the high frequency chopping state, and the control signals of Q1, Q4, Q5 and Q6 are in the low frequency state. Specifically, as shown in FIG. 4, the control signals of Q1 and Q6 are kept in the high level state during a positive half period and are kept in the low level state during a negative half period. The control signals of Q4 and Q5 are kept in the low level state during the positive half period and are kept in the high level state during the negative half period.

Under the second control mode, the control signals of Q2 and Q3 are in the high frequency chopping state, while the control signals of Q1, Q5, Q6 and Q4 are in the low frequency state. Therefore, it is preferable to select transistors with small switching losses to be Q2 and Q3, and select transistors with small conduction losses to be Q1, Q5, Q6 and Q4.

Figure 5A:
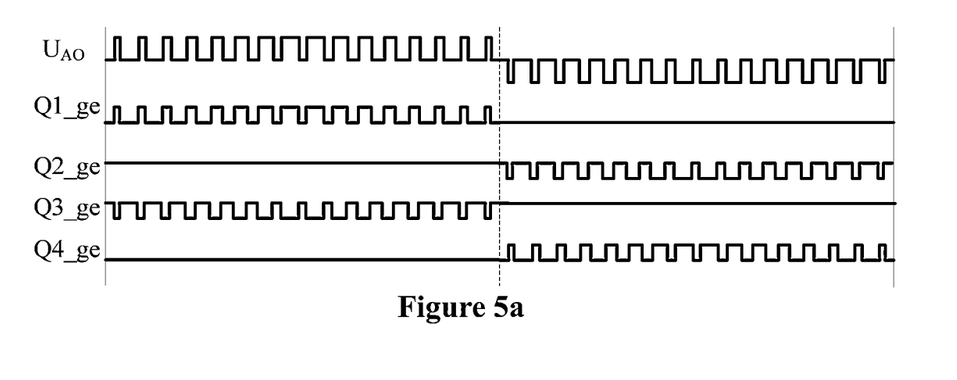
FIG. 5a shows waveforms of control signals of the inverter circuit shown in FIG. 2, upon operating under a third control mode.

Reference is made to FIG. 5a, which shows waveforms of control signals of the transistors when the inverter circuit operates in the normal state, under the third control mode.

Figure 5B:
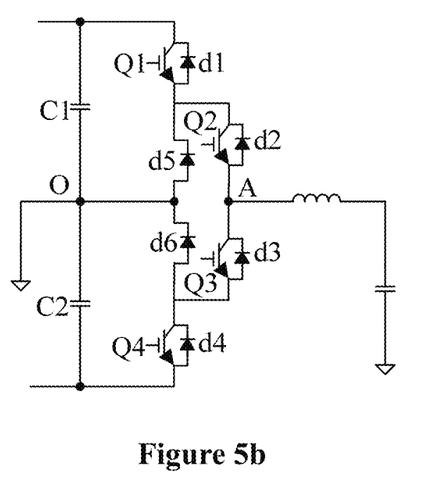
FIG. 5b is a circuit diagram equivalent to the inverter circuit shown in FIG. 2 upon operating under the third control mode.

Under the third control mode, during a positive half period of a line frequency cycle, the control signals of Q1 and Q3 are in the high frequency chopping state, the control signal of Q2 is kept in the high level state, and the control signal of Q4 is kept in the low level state; during a negative half period of the line frequency cycle, the control signals of Q2 and Q4 are in the high frequency chopping state, the control signal of Q1 is kept in the low level state, and the control signal of Q3 is kept in the high level state. During the full line frequency cycle, the control signals of Q5 and Q6 are kept in the low level state. The circuit shown in FIG. 5 is an equivalent circuit to the inverter circuit shown in FIG. 2 when the inverter circuit is under the third control mode, and specifically, at this time the transistors Q5 and Q6 in FIG. 2 are both turned off under a control signal being in the low level state, thus the circuit diagram shown in FIG. 5b is obtained by removing the transistors Q5 and Q6 from FIG. 2.

Under the third control mode, since the control signals of Q1, Q2, Q3 and Q4 are in the high frequency chopping state, it is preferable to select transistors with small switching losses to be Q1, Q2, Q3 and Q4.

For the neutral point clamped three-level inverter circuit currently operating under the first control mode, in a case that it is detected that a direct current (DC) voltage across the inverter circuit is larger than the preset voltage, alternatively, an alternating current (AC) in the inverter circuit is larger than the preset current, then it is determined that the inverter circuit operates in the abnormal state. At this time, a current flowing through Q5 or Q6 may be larger than a rated current of Q5 or Q6, and moreover, a transistor being in the high frequency chopping state has a largest switching loss. Specifically, Q5 may be damaged if the abnormal state of the inverter circuit occurs within the positive half period, and Q6 may be damaged if the abnormal state of the inverter circuit occurs within the negative half period.

In this application scenario, the control mode of the inverter circuit may be changed from the first control mode to a specified control mode under which the control signals of Q5 and Q6 are in the low frequency state. For example, the specified control mode may be the second control mode or the third control mode.

Figure 6:
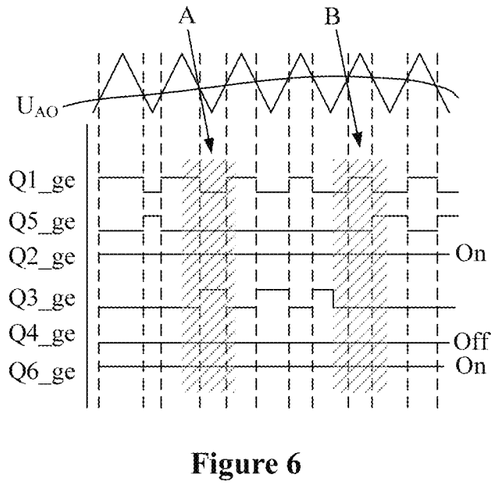
FIG. 6 shows waveforms of control signals when changing a control mode of the inverter circuit shown in FIG. 2 from the first control mode to the third control mode.

In an embodiment, the control mode of the inverter circuit which operates in the abnormal state may be changed from the first control mode to the third control mode, as shown in FIG. 6. FIG. 6 shows waveforms of control signals of transistors Q1-Q6 when the control mode of the neutral point clamped three-level inverter circuit is changed from the first control mode to the third control mode during the positive half period.

Given that it is detected the abnormal state of the inverter circuit at a time point "A", then at this time, it is to change a control signal of Q5 from the high frequency chopping state to a constant low level state, change a control signal of Q3 from the constant low level state to the high frequency chopping state, and change a control signal of Q6 from a constant high level state to the constant low level state, while control signals of Q1, Q2 and Q4 are not changed.

Given that it is detected at a time point "B" that the inverter circuit is recovered to the normal state, then at this time, it is to change the control signal of Q5 from the constant low level state to the high frequency chopping state, change the control signal of Q3 from the high frequency chopping state to the constant low level state, and change the control signal of Q6 from the constant low level state to the constant high level state.

In addition, a process of changing the control mode of the neutral point clamped three-level inverter circuit from the first control mode to the third control mode during the negative half period is descried as following.

When it is detected the abnormal state of the inverter circuit, it is to change the control signal of Q6 from the high frequency chopping state to the constant low level state, change the control signal of Q2 from the constant low level state to the high frequency chopping state, and change the control signal of Q5 from the constant high level state to the constant low level state, while the control signals of Q1, Q3 and Q4 are not changed.

When it is detected that the inverter circuit is recovered to the normal state, it is to change the control signal of Q6 from the constant low level state to the high frequency chopping state, change the control signal of Q2 from the high frequency chopping state to the constant low level state, and change the control signal of Q5 from the constant low level state to the constant high level state, while the control signals of Q1, Q3 and Q4 are not changed.

Figure 7:
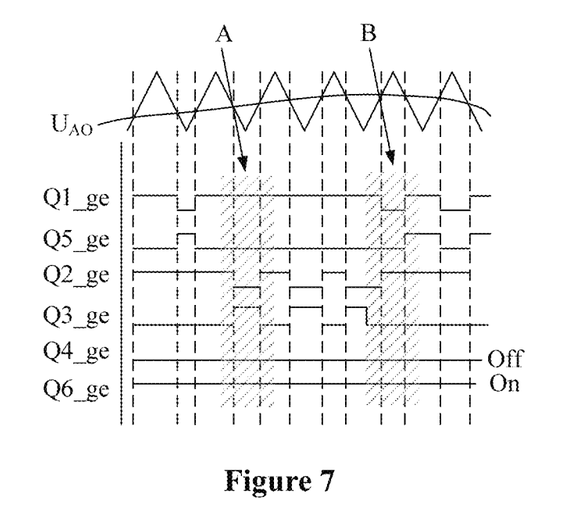
FIG. 7 shows waveforms of control signals when changing a control mode of the inverter circuit shown in FIG. 2 from the first control mode to the second control mode.

In an embodiment, the control mode of the inverter circuit which operates in the abnormal state may be changed from the first control mode to the second control mode, as shown in FIG. 7. FIG. 7 shows waveforms of control signals when the control mode of the neutral point clamped three-level inverter circuit is changed from the first control mode to the second control mode during the positive half period.

Given that it is detected the abnormal state of the inverter circuit at a time point "A", at this time, it is to change the control signal of Q5 from the high frequency chopping state to the constant low level state, change the control signal of Q1 from the high frequency chopping state to the constant high level state, change the control signal of Q2 from the constant high level state to the high frequency chopping state, and change the control signal of Q3 from the constant low level state to the high frequency chopping state, while control signals of Q4 and Q6 are not changed.

Given that it is detected at a time point "B" that the inverter circuit is recovered to the normal state, at this time, it is to change the control signal of Q5 from the constant low level state to the high frequency chopping state, change the control signal of Q1 from the constant high level state to the high frequency chopping state, change the control signal of Q2 from the high frequency chopping state to the constant high level state, and change the control signal of Q3 from the high frequency chopping state to the constant low level state.

In addition, a process of changing the control mode of the neutral point clamped three-level inverter circuit from the first control mode to the second control mode during the negative half period is descried as following.

When it is detected the abnormal state of the inverter circuit, it is to change the control signal of Q6 from the high frequency chopping state to the constant low level state, change the control signal of Q4 from the high frequency chopping state to the constant high level state, change the control signal of Q2 from the constant low level state to the high frequency chopping state, and change the control signal of Q3 from the constant high level state to the high frequency chopping state, while the control signals of Q1 and Q5 are not changed.

When it is detected that the inverter circuit is recovered to the normal state, it is to change the control signal of Q6 from the constant low level state to the high frequency chopping state, change the control signal of Q4 from the constant high level state to the high frequency chopping state, change the control signal of Q2 from the high frequency chopping state to the constant low level state, and change the control signal of Q3 the high frequency chopping state to the constant high level state, while the control signals of Q1 and Q5 are not changed.

For a neutral point clamped three-level inverter circuit currently operating under the second control mode, in a case that the abnormal state of the inverter circuit occurs during the positive half period, a current flowing through Q3 may be larger than a rated current of Q3, which means Q3 is the specified transistor in this application scenario. In a case that the abnormal state of the inverter circuit occurs during the negative half period, a current flowing through Q2 may be larger than a rated current of Q2, which means Q2 is the specified transistor in this application scenario. Therefore, in a case that the abnormal state occurs in the inverter circuit under the second control mode, it is required to change the control mode of the inverter circuit from the second control mode to a specified control mode in which Q2 and Q3 are in the low frequency state, that is, the control mode of the inverter circuit is changed from the second control mode to the first control mode.

Figure 8:
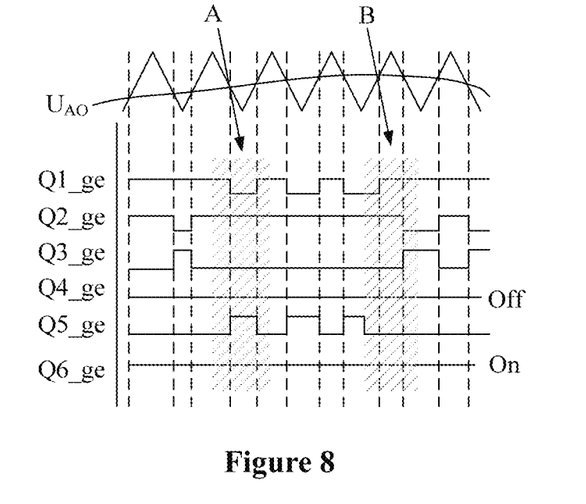
FIG. 8 shows waveforms of control signals when changing a control mode of the inverter circuit shown in FIG. 2 from the second control mode to the first control mode.

As shown in FIG. 8, FIG. 8 shows waveforms of control signals when the control mode of the neutral point clamped three-level inverter circuit is changed from the second control mode to the first control mode during the positive half period.

Given that it is detected the abnormal state of the inverter circuit at a time point "A", at this time, it is to change the control signal of Q3 from the high frequency chopping state to the constant low level state, change the control signal of Q2 from the high frequency chopping state to the constant high level state, change the control signal of Q1 from the constant high level state to the high frequency chopping state, and change the control signal of Q5 from the constant low level state to the high frequency chopping state, while the control signals of Q4 and Q6 are not changed.

Given that it is detected at a time point "B" that the inverter circuit is recovered to the normal state, at this time, it is to change the control signal of Q3 from the constant low level state to the high frequency chopping state, change the control signal of Q2 from the constant high level state to the high frequency chopping state, change the control signal of Q1 from the high frequency chopping state to the constant high level state, and change the control signal of Q5 from the high frequency chopping state to the constant low level state.

In addition, in a case that the abnormal state of the inverter circuit occurs during the negative half period, it is to change the control signal of Q2 from the high frequency chopping state to the constant low level state, change the control signal of Q3 from the high frequency chopping state to the constant high level state, change the control signal of Q4 from the constant high level state to the high frequency chopping state, and change the control signal of Q6 from the constant low level state to the high frequency chopping state, while the control signals of Q1 and Q5 are not changed. When the inverter circuit recovers to the normal state, the control mode of the inverter circuit is changed from the first control mode to the second control mode, which is not repeated herein.

For the neutral point clamped three-level inverter circuit currently operating under the third control mode, in a case that the abnormal state of the inverter circuit occurs during the positive half period, a current flowing through Q3 may be larger than the rated current of Q3, which means Q3 is the specified transistor in this application scenario. In a case that the abnormal state of the inverter circuit occurs during the negative half period, a current flowing through Q2 may be larger than the rated current of Q2, which means Q2 is the specified transistor in this application scenario. Therefore, in a case that the abnormal state occurs in the inverter circuit under the third control mode, it is required to change the control mode of the inverter circuit from the third control mode to a specified control mode in which Q2 and Q3 are in the low frequency state, that is, the control mode of the inverter circuit is changed from the third control mode to the first control mode.

Figure 9:
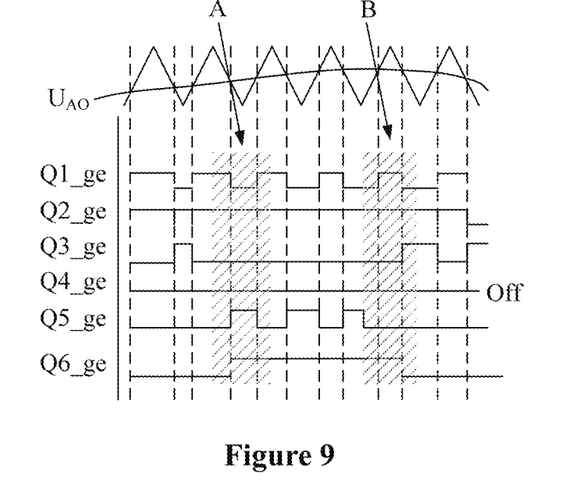
FIG. 9 shows waveforms of control signals when changing a control mode of the inverter circuit shown in FIG. 2 from the third control mode to the first control mode.

As shown in FIG. 9, FIG. 9 shows waveforms of control signals when the control mode of the neutral point clamped three-level inverter circuit is changed from the third control mode to the first control mode during the positive half period.

Given that it is detected at a time point "A" that the abnormal state occurs in the inverter circuit under the third control mode, at this time, it is to change the control signal of Q3 from the high frequency chopping state to the constant low level state, change the control signal of Q5 from the constant low level state to the high frequency chopping state, and change the control signal of Q6 from the constant low level state to the constant high level state, while the control signals of Q1, Q2 and Q4 are not changed.

Given that it is detected that the inverter circuit is recovered to the normal state at a time point "B", at this time, it is to change the control mode of the inverter circuit from the first control mode to the third control mode. Specifically, it is to change the control signal of Q3 from the constant low level state to the high frequency chopping state, change the control signal of Q5 from the high frequency chopping state to the constant low level state, and change the control signal of Q6 from the constant high level state to the constant low level state, while the control signals of Q1, Q2 and Q4 are not changed.

In a case that the abnormal state of the inverter circuit under the third control mode occurs during the negative half period, it is to change the control signal of Q2 from the high frequency chopping state to the constant low level state, change the control signal of Q6 from the constant low level state to the high frequency chopping state, and change the control signal of Q5 from the constant low level state to the constant high level state, while the control signals of Q1, Q3 and Q4 are not changed. In a case that the inverter circuit recovers to the normal state during the negative half period, the control mode of the inverter circuit is changed from the first control mode to the third control mode, which is not repeated herein.

In addition, based on the method for controlling an inverter circuit described above, an apparatus for controlling an inverter circuit is further provided in an embodiment of the present disclosure.

Figure 10:
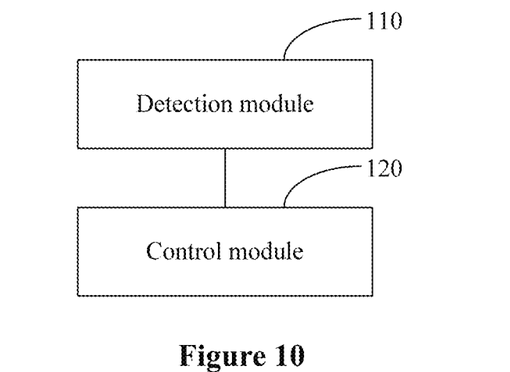
FIG. 10 is a schematic structural diagram of an apparatus for controlling an inverter circuit according to the present disclosure.

Reference is made to FIG. 10, which is a schematic structural diagram of an apparatus for controlling an inverter circuit according to the present disclosure. The apparatus is mainly configured to control an operation state of the inverter circuit and change a control mode of the inverter circuit in response to an abnormal state of the inverter circuit.

As shown in FIG. 10, the apparatus includes a detection module 110 and a control module 120.

The detection module 110 is configured to detect whether the inverter circuit operates in an abnormal state.

The abnormal state includes a state when a power factor of the inverter circuit is less than a preset value.

The control module 120 controls an operation state of the inverter circuit, and changes a control mode of the inverter circuit from an original control mode to a specified control mode in a case that the inverter circuit operates in the abnormal state.

A specified transistor is in an off state under the specified control mode. A current flowing through the specified transistor when the inverter circuit operates in the abnormal state is greater than a rated current of the specified transistor.

According to another aspect of the present disclosure, an inverter is further provided in an embodiment of the present disclosure. The inverter includes an inverter circuit and a controller.

The inverter circuit has at least two control modes, and the inverter circuit is able to operate in a normal state under each of the at least two control modes.

The inverter circuit may be the neutral point clamped three-level inverter circuit shown in FIG. 2, which is not repeated herein. The inverter circuit may have three control modes as shown in FIG. 3 to FIG. 5a.

The controller controls the inverter circuit, detects whether the inverter circuit operates in an abnormal state, and changes a control mode of the inverter circuit from an original control mode to a specified control mode in response to detecting that the inverter circuit operates in the abnormal state.

The abnormal state includes a state when a power factor of the inverter circuit is less than a preset value. Under the specified control mode, a specified transistor is in an off state. A current flowing through the specified transistor when the inverter circuit operates in the abnormal state is greater than a rated current of the specified transistor.

In an embodiment, the inverter circuit currently operates in the first control mode. The first control mode is changed from the first control mode to the third control mode or the second control mode in a case of the abnormal state of the inverter circuit.

In an embodiment, the inverter circuit currently operates in the second control mode. The control mode of the inverter circuit is changed from the second control mode into the first control mode in a case of the abnormal state of the inverter circuit.

In an embodiment, the inverter circuit currently operates in the third control mode. The control mode of the inverter circuit is changed from the third control mode to the first control mode in a case of the abnormal state of the inverter circuit.

The above method embodiments are described as a series of combinations of actions for convenience of the descriptions, but those skilled in the art should understand that the present disclosure is not limited to the described sequence of the actions because some of the steps can be performed in a different sequence or concurrently according to the present disclosure. In addition, those skilled in the art should also understand that embodiments described in the application are preferred embodiments. Actions and modules in the embodiments are not necessarily required for the present disclosure.

It is to be noted that, same or similar parts among the embodiments in the description can be referred to each other. Since the apparatus disclosed in the embodiments is basically similar to the method therein, the description thereof is relatively simple, and for relevant matters references may be made to the description of the method.

The steps in the method according to the embodiments of the present disclosure may be changed, combined and deleted as needed.

Devices, modules and sub-modules in the terminal according to the embodiments of the present disclosure may be combined, divided and deleted as needed.

In the embodiments of the present disclosure, it is to be understood that terminals, devices and the methods disclosed may be implemented in other manners. For example, terminal embodiments described above are merely schematic. For example, the modules and sub-modules are divided based on logical functions, and other division manners may be used in practical applications. For example, multiple sub-modules or modules may be combined or integrated into another module. Some features may be neglected or not be performed. In addition, the displayed or discussed mutual coupling, direct coupling or communication connection may be implemented through indirect coupling or communication connection through some interfaces, devices or modules, and may also be electrical, mechanical, or other forms.

Modules or sub-modules described as divided components may be or may not be separated physically. Components served as modules or sub-modules may be or may not be physical modules or sub-modules, that is, the components may be located in a same network module or sub-module. Alternatively, the components may be distributed in multiple network modules or sub-modules. Part or all of modules or sub-modules may be selected as needed to implement solutions according to the embodiments of the present disclosure.

In addition, functional modules or sub-modules in the embodiments of the present disclosure may be integrated in a processing module or may be separated physically. Alternatively, two or more modules or sub-modules may be integrated in a module. The above integrated modules or sub-modules may be implemented in a form of hardware, or may also be implemented in a form of a software functional module or sub-module.

Moreover, it is to be noted that, in the present disclosure, relational terms such as "first" and "second" are merely used to distinguish one entity or operation from another entity or operation, but do not indicate or imply an actual relationship or order of these entities or operations. In addition, terms of "include", "comprise" or any other variants are intended to be non-exclusive. Therefore, a process, method, article or device including multiple elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device.

With the description of the embodiments disclosed above, those skilled in the art may implement or use technical solutions of the present disclosure. Numerous modifications to the embodiments are apparent to those skilled in the art, and the general principles defined herein may be implemented in other embodiments without departing from the spirit or scope of the present disclosure. Therefore, the present disclosure may not be limited to the embodiments described herein, but should comply with the widest scope consistent with the principles and novel features disclosed herein.

The descriptions above are just preferred embodiments of the present disclosure, and it is noted that those skilled in the art may make various improvements and modifications without departing from the principle of the present disclosure. The improvements and modifications also fall within the protection scope of the present disclosure.

The invention claimed is:

1. A method for controlling an inverter circuit, wherein the inverter circuit has at least two control modes, and the inverter circuit is able to operate in a normal state under each of the at least two control modes; the method comprising:
   detecting whether the inverter circuit operates in an abnormal state, wherein the abnormal state comprises a state when a power factor of the inverter circuit is less than a preset value; and
   changing a control mode of the inverter circuit from an original control mode to a specified control mode in response to detecting that the inverter circuit operates in the abnormal state, wherein the specified control mode is one of the at least two control modes of the inverter circuit, a specified transistor is in a low frequency state under the specified control mode, and the specified transistor is a transistor whose current flowing through the specified transistor is greater than a maximum allowable collector current of the specified transistor when the inverter circuit operates in the abnormal state.

2. The method according to claim 1, further comprising:
   changing the control mode of the inverter circuit from the specified control mode to the original control mode, in response to detecting that the inverter circuit recovers to the normal state from the abnormal state.

3. The method according to claim 1, wherein the inverter circuit is a neutral point clamped three-level inverter circuit, the inverter circuit comprising:
   a first capacitor and a second capacitor connected in series, wherein a first terminal of the first capacitor is connected to a first terminal of the second capacitor, and a second terminal of the first capacitor is connected to a positive pole of a direct current power supply, and a second terminal of the second capacitor is connected to a negative pole of the direct current power supply;
   a first transistor, a fifth transistor, a sixth transistor and a fourth transistor sequentially connected in series, to form a first series branch, wherein a first terminal of the first series branch is connected to the second terminal of the first capacitor, and a second terminal of the first series branch is connected to the second terminal of the second capacitor; and a second transistor and a third transistor connected in series, to form a second series branch, wherein a first terminal of the second series branch is connected to a connection node between the fifth transistor and the first transistor, a second terminal of the second series branch is connected to a connection node between the sixth transistor and the fourth transistor, and a connection node between the second transistor and the third transistor is an output terminal of the inverter circuit.

4. The method according to claim 3, wherein the at least two control modes comprise a first control mode, a second control mode and a third control mode, wherein during a positive half period under the first control mode, a control signal of the first transistor and a control signal of the fifth transistor are in a high frequency chopping state, a control signal of the second transistor, a control signal of the third transistor, a control signal of the fourth transistor and a control signal of the sixth transistor are in a low frequency state; during a negative half period under the first control mode, the control signal of the fourth transistor and the control signal of the sixth transistor are in the high frequency chopping state, the control signal of the first transistor, the control signal of the fifth transistor, the control signal of the second transistor and the control signal of the third transistor are in the low frequency state;

during a full period under the second control mode, the control signal of the second transistor and the control signal of the third transistor are in the high frequency chopping state, the control signal of the first transistor, the control signal of the fourth transistor, the control signal of the fifth transistor and the control signal of the sixth transistor are in the low frequency state;

during a positive half period under the third control mode, the control signal of the first transistor and the control signal of the third transistor are in the high frequency chopping state, the control signal of the second transistor and the control signal of the fourth transistor are in the low frequency state; and during a negative half period under the third control mode, the control signal of the second transistor and the control signal of the fourth transistor are in the high frequency chopping state, and the control signal of the first transistor and the control signal of the third transistor are in the low frequency state.

5. The method according to claim 4, wherein the specified control mode is the third control mode or the second control mode, in a case that the original control mode is the first control mode;

alternatively, the specified control mode is the first control mode, in a case that the original control mode is the second control mode or the third control mode.

6. An apparatus for controlling an inverter circuit, wherein the inverter circuit has at least two control modes, and the inverter circuit is able to operate in a normal state under each of the at least two control modes; the apparatus comprising:

a detection module, configured to detect whether the inverter circuit operates in an abnormal state, wherein the abnormal state comprises a state when a power factor of the inverter circuit is less than a preset value; and a control module, configured to control an operation state of the inverter circuit, and change a control mode of the inverter circuit to a specified control mode in a case that the inverter circuit operates in the abnormal state, wherein the specified control mode is one of the at least two control modes of the inverter circuit, a specified transistor is in a low frequency state under the specified control mode, and the specified transistor is a transistor whose current flowing through the specified transistor is greater than a maximum allowable collector current of the specified transistor when the inverter circuit operates in the abnormal state.

7. An inverter, comprising:

an inverter circuit, wherein the inverter circuit has at least two control modes, and the inverter circuit is able to operate in a normal state under each of the at least two control modes; and a controller, configured to control the inverter circuit, detect whether the inverter circuit operates in an abnormal state, and change a control mode of the inverter circuit from an original control mode to a specified control mode in a case that the inverter circuit operates in the abnormal state, wherein the abnormal state comprises a state when a power factor of the inverter circuit is less than a preset value, and the specified control mode is one of the at least two control modes of the inverter circuit, a specified transistor is in a low frequency state under the specified control mode, and the specified transistor is a transistor whose current flowing through the specified transistor is greater than a maximum allowable collector current of the specified transistor when the inverter circuit operates in the abnormal state.

8. The inverter according to claim 7, wherein the inverter circuit is a neutral point clamped three-level inverter circuit, the inverter circuit comprising:

a first capacitor and a second capacitor connected in series, wherein a first terminal of the first capacitor is connected to a first terminal of the second capacitor, a second terminal of the first capacitor is connected to a positive pole of a direct current power supply, and a second terminal of the second capacitor is connected to a negative pole of the direct current power supply;

a first transistor, a fifth transistor, a sixth transistor and a fourth transistor sequentially connected in series, to form a first series branch, wherein a first terminal of the first series branch is connected to the second terminal of the first capacitor, and a second terminal of the first series branch is connected to the second terminal of the second capacitor; and a second transistor and a third transistor connected in series to form a second series branch, wherein a first terminal of the second series branch is connected to a connection node between the fifth transistor and the first transistor, a second terminal of the second series branch is connected to a connection node between the sixth transistor and fourth transistor, and a connection node between the second transistor and the third transistor is an output terminal of the inverter circuit.

9. The inverter according to claim 8, wherein the at least two control modes comprise a first control mode, a second control mode and a third control mode, wherein during a positive half period under the first control mode, a control signal of the first transistor and a control signal of the fifth transistor are in a high frequency chopping state, a control signal of the second transistor, a control signal of the third transistor, a control signal of the fourth transistor and a control signal of the sixth transistor are in a low frequency state; during a negative half period under the first control mode, the control signal of the fourth transistor and the control signal of the sixth transistor are in the high frequency chopping state, the control signal of the first transistor, the control signal of the fifth transistor, the control signal of the second transistor and the control signal of the third transistor are in the low frequency state;

during a full period under the second control mode, the control signal of the second transistor and the control signal of the third transistor are in the high frequency chopping state, the control signal of the first transistor, the control signal of the fourth transistor, the control signal of the fifth transistor and the control signal of the sixth transistor are in the low frequency state;

during a positive half period under the third control mode, the control signal of the first transistor and the control signal of the third transistor are in the high frequency chopping state, and the control signal of the second transistor and the control signal of the fourth transistor are in the low frequency state; and during a negative half period under the third control mode, the control signal of the second transistor and the control signal of the fourth transistor are in the high frequency chopping state, and the control signal of the first transistor and the control signal of the third transistor are in the low frequency state.

10. The inverter according to claim 9, wherein the specified control mode is the third control mode or the second control mode, in a case that the original control mode is the first control mode;

alternatively, the specified control mode is the first control mode, in a case that the original control mode is the second control mode or the third control mode.

\* \* \* \* \*